(Model.)

J. J. FRANKLIN.
DEVICE FOR CUTTING BOILER TUBES.

No. 256,474. Patented Apr. 18, 1882.

WITNESSES:
Fred. G. Dieterich,
P. E. Dieterich.

INVENTOR.
James J. Franklin,
by C. A. Snow & Co.
ATTORNEYS.

UNITED STATES PATENT OFFICE.

JAMES J. FRANKLIN, OF TYLER, TEXAS.

DEVICE FOR CUTTING BOILER-TUBES.

SPECIFICATION forming part of Letters Patent No. 256,474, dated April 18, 1882.

Application filed February 17, 1882. (Model.)

*To all whom it may concern:*

Be it known that I, JAMES J. FRANKLIN, of Tyler, in the county of Smith and State of Texas, have invented certain new and useful Improvements in Devices for Cutting Tubes Out of Boilers; and I do hereby declare that the following is a full, clear, and exact description of the invention, which will enable others skilled in the art to which it appertains to make and use the same, reference being had to the accompanying drawings, which form a part of this specification.

Figure 1:
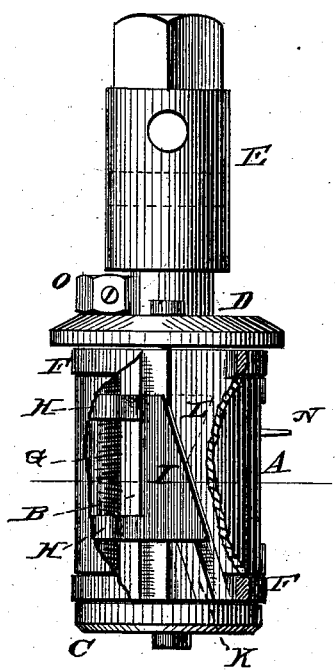
Figure 2:
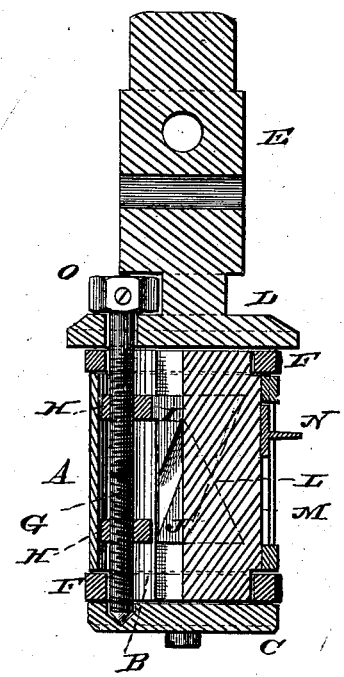
Figure 3:
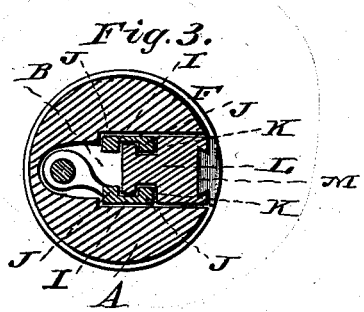
Figure 4:
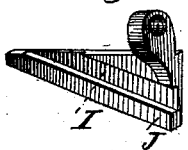

Figure 1 is a side view of my improved device for cutting out boiler-tubes, part of the casing having been removed in order to show the construction. Fig. 2 is a longitudinal sectional view. Fig. 3 is a vertical cross-section; and Fig. 4 is a perspective view of one of the flanged wedges I detached.

Corresponding parts in the several figures are denoted by like letters of reference.

This invention relates to an improved device or tool for cutting tubes, and which is especially adapted for cutting tubes out of boilers without injury to the tube-sheet; and it consists in the improved construction, arrangement, and combination of parts which will be hereinafter fully described, and particularly pointed out in the claims.

In the drawings hereto annexed, A represents the shell or casing, which is cylindrical in shape and provided with a longitudinal slot or recess, B, to receive the working parts of the device. Secured to the ends of the shell or casing are the heads C D, the latter of which has a stem or shank, E, upon which a wrench may be adjusted for turning and operating the device.

The ends of the casing A are recessed or shouldered to receive rings F, which are interposed between said shell or casing and the heads. These rings are to be of a size or diameter equal to the inside diameter of the tubes to be cut, and they thus form bearings for the tool during operation. It will be seen that owing to these rings the friction is much less than if the shell or casing were fitted to the tube; and another important advantage is that by removing the rings and substituting others of a different size different sizes of tubes may be cut with the same tool.

G is a right-and-left-hand screw, placed longitudinally in the shell or casing, and having its ends journaled in the heads C D, beyond which latter it projects, as shown, and is provided with a nut, O, rigidly secured thereupon, so that it may be easily turned by means of a wrench.

Mounted upon the screw G are nuts H, carrying wedges I, which are inclined toward each other and provided with flanges J, fitting in the inclined grooves K in the sides of a block, L, fitting in the recess B of casing A, as shown. The upper or outer side of block L has a longitudinal dovetailed groove, M, in which a cutter, N, is adjustable.

It will be observed that the head D of the device is larger in diameter than the shell or casing A, at the end of which it forms an annular flange or shoulder. This is not absolutely necessary, but when the device is to be used for cutting out boiler-tubes eminently desirable.

The operation of my invention will be readily understood. The cutter is to be adjusted a distance from the head D sufficiently in excess of the thickness of the tube-sheet to prevent injury to the latter. The device is then inserted into the end of the tube, with the head D abutting against the outside of the tube-sheet. By turning the screw G the wedges I may then be drawn toward each other, thus forcing the block carrying the cutter outward. The device is now to be turned by the shank E alternately with feeding the cutter outward until the tube has been cut through, after which it may be readily removed. The small end of the tube left in the tube-sheet may be easily driven out.

This device is simple and easily operated without the injury to the tube-sheet and without leaving the ragged ends upon the tubes commonly caused by the use of a chisel and hammer.

Having thus described my invention, I claim and desire to secure by Letters Patent of the United States—

1. The combination of the shell or casing A, having recess B, the heads C D, the right-and-left-hand screw G, having rigid nut O and loose nuts H H, carrying flanged wedges I, and the block L, having cutter N and inclined grooves K, substantially as and for the purpose set forth.

2. The combination, in a tube-cutter, of the shell A, having head D, forming an annular flange of larger diameter than the tubes to be cut, and provided with stem or shank E, the detachable bearing-rings F, the longitudinally grooved block L, having adjustable cutter N, and mechanism for forcing said block in an outward direction, as set forth.

In testimony that I claim the foregoing as my own I have hereto affixed my signature in presence of two witnesses.

JAMES JOHNSON FRANKLIN.

Witnesses:
  JEFF. D. BURNS,
  GEORGE ADAMS.